(12) United States Patent
Kotani et al.

(10) Patent No.: US 6,552,756 B1
(45) Date of Patent: Apr. 22, 2003

(54) RECORDING METHOD AND RECORDING DEVICE USING A HEAT REVERSIBLE RECORDING MEDIUM

(75) Inventors: Shoji Kotani, Otsu (JP); Naoya Suzuki, Takatsuki (JP); Hideaki Ueda, Kishiwada (JP); Eiji Yamakawa, Sanda (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/564,107

(22) Filed: May 3, 2000

(30) Foreign Application Priority Data

May 10, 1999 (JP) .......................................... 11-128789

(51) Int. Cl.[7] ............................................ G02F 1/1336
(52) U.S. Cl. ............................. 349/20; 349/21; 349/22; 349/2
(58) Field of Search ............................. 349/20, 21, 22, 349/168, 1

(56) References Cited

U.S. PATENT DOCUMENTS

| | | | | |
|---|---|---|---|---|
| 3,847,139 A | * | 11/1974 | Flam | 349/199 |
| 4,249,800 A | | 2/1981 | Spruijt | 350/320 |
| 4,688,901 A | * | 8/1987 | Albert | 349/117 |
| 4,965,591 A | * | 10/1990 | Kurabayashi et al. | 346/135.1 |
| 5,024,784 A | * | 6/1991 | Eich et al. | 252/299.01 |
| 5,066,107 A | * | 11/1991 | Yoshinaga et al. | 349/172 |
| 5,437,811 A | | 8/1995 | Doane et al. | 252/299.01 |

FOREIGN PATENT DOCUMENTS

| | | | | |
|---|---|---|---|---|
| JP | 62159115 a1 | * | 7/1987 | 349/20 |
| JP | 11-024027 A | | 1/1999 | |

OTHER PUBLICATIONS

"Rewritable Full–Color Recording on a Thin Solid Film of a Cholesteric Low–Molecular–Weight Compound", Tamaoki et al., *Advanced Materials*, vol. 9, No. 14, 1997, pp. 1102–1104.

* cited by examiner

*Primary Examiner*—James Dudek
(74) *Attorney, Agent, or Firm*—Sidley Austin Brown & Wood LLP (57) ABSTRACT

A heat reversible recording medium is disclosed which includes a cholesteric liquid crystal compound. By selective application of differing temperature profiles, regions of the recording medium can be fixed in states which selectively reflect light in different wavelengths thus providing the ability to fix color images in the medium. The disclosure also includes a method of recording a color image using a medium which includes a cholesteric liquid crystal compound, an apparatus for fixing an image in the recording medium as well as several cholesteric liquid crystal compounds which are suitable for use in the method and apparatus.

25 Claims, 5 Drawing Sheets

RECORDING METHOD AND RECORDING DEVICE USING A HEAT REVERSIBLE RECORDING MEDIUM

RELATED APPLICATIONS

This application is based on Application No. 11-128789 filed in Japan, the entire contents of which is hereby incorporated by reference.

FIELD OF THE INVENTION

The present invention pertains to a recording method and recording device using a heat reversible recording medium, and more particularly to a recording method and recording device using a heat reversible recording medium including a cholesteric liquid crystal compound.

BACKGROUND OF THE INVENTION

Conventionally, heat reversible liquid crystal compounds that exhibit a solid phase at a room temperature and selectively reflect light of specific wavelengths when they are heated until a cholesteric liquid crystal phase is achieved are known in the art (see e.g., Advanced Materials 1997, 9, No. 14, pp. 1102–1104). Research by the inventors of this invention, has revealed, however, that with these cholesteric liquid crystal compounds, the temperature range and the selective reflection wavelength range that exhibit a cholesteric liquid crystal phase when the temperature is rising are different from those when the temperature is falling.

Figure 8:
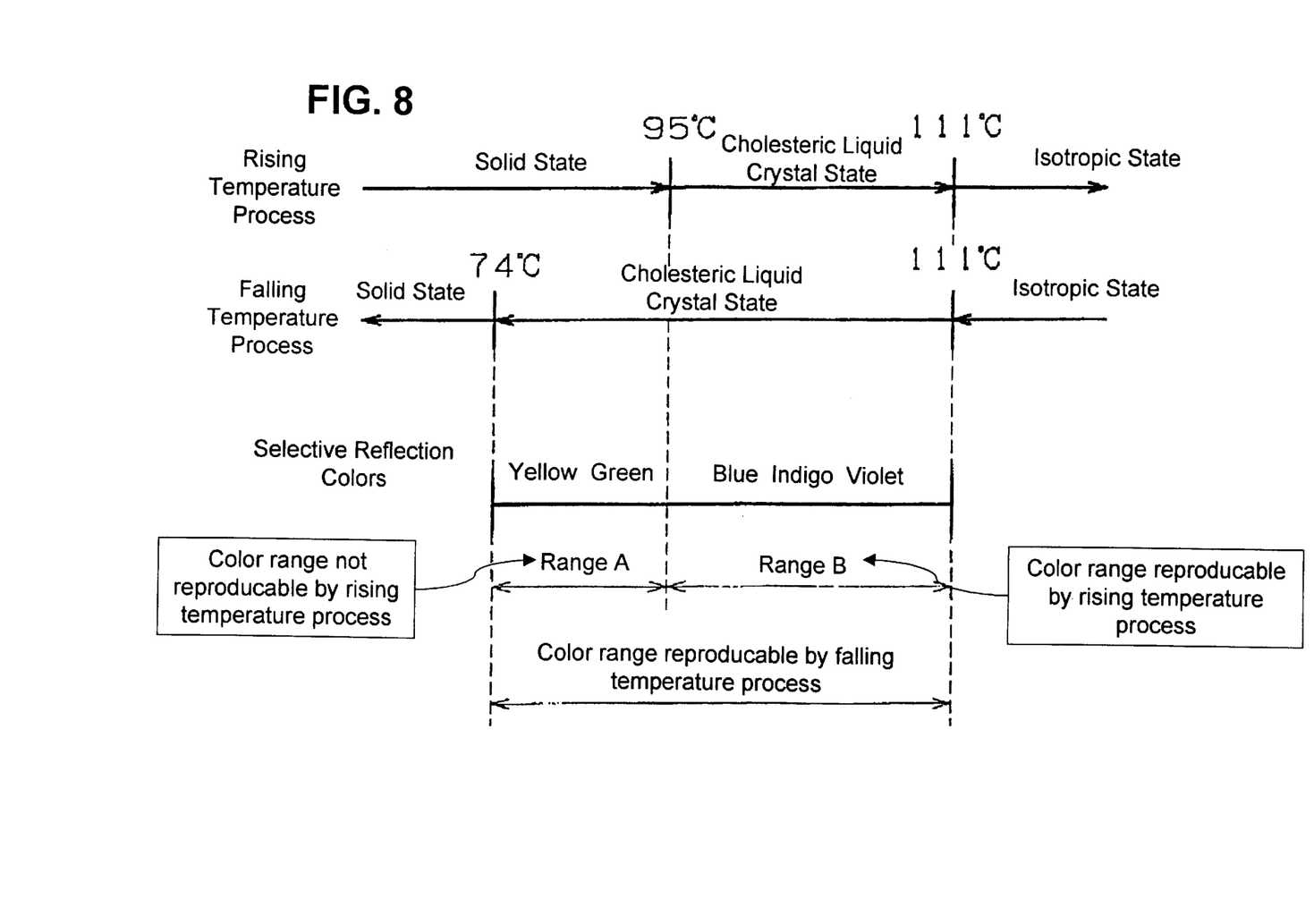
FIG. 8 is a drawing to explain the selective reflection characteristics of a cholesteric liquid crystal compound when the temperature rises and when the temperature falls.

FIG. 8 shows a typical example which reveals aspects of the inventive concept. The temperature range and the reproducible selective reflection wavelength range are different in the situations when the temperature of the liquid crystal compound rises, that is where it is heated from a solid phase to a cholesteric liquid crystal phase and then to an isotropic phase, in comparison to when the temperature falls, that is where the liquid crystal compound in an isotropic phase changes to a cholesteric liquid crystal phase and then to a solid phase. During the inventor's research, it was found that with these compounds, the temperature range and reproducible selective reflection wavelength range that exhibit a liquid crystal phase are narrower in general when the temperature rises than when it falls, and in particular, selective reflection of long wavelength light is more difficult to achieve when the temperature of the compound rises.

Where images are written using a heat reversible recording medium comprising one of these cholesteric liquid crystal compounds, writing may be performed using a process in which the temperature is increased to the level at which the compound exhibits selective reflection and is then rapidly cooled. However, this process entails the problem that the selective reflection wavelength range is narrow and limited to the short wavelength side.

On the other hand, where image writing is performed using the temperature reduction process, it is necessary to first raise the temperature of the heat reversible recording medium to the point at which the liquid crystal exhibits an isotropic phase, and then gradually cool the medium down to the level at which the liquid crystal exhibits selective reflection, followed by rapid cooling. However, such a gradual cooling process requires a substantial amount of time for writing, which is not desirable.

SUMMARY OF THE INVENTION

An object of the present invention, therefore, is to provide a new and useful recording method and recording device using a heat reversible recording medium including a cholesteric liquid crystal compound, which enables recording using any desired reflection colors. Another object of the present invention is to provide a recording method and recording device using a heat reversible recording medium, which offers a wide selective reflection wavelength range and which can perform image writing at high speed based on simple temperature control.

In order to attain this and other objects, the recording method pertaining to the present invention consists of a recording method using a heat reversible recording medium including a cholesteric liquid crystal compound, wherein the recording method includes a first process in which all or part of the cholesteric liquid crystal compound of the recording medium is fixed in a state in which it reflects light having a first wavelength, and a second process in which part of the cholesteric liquid crystal compound of the recording medium fixed in the first wavelength light reflection state becomes fixed in a state in which it reflects light having a second wavelength that is shorter than the first wavelength.

Additionally, in order to attain this and other objects, the recording method pertaining to the present invention consists of a recording method using a heat reversible recording medium including a cholesteric liquid crystal compound, wherein the recording method includes a first process in which all or part of the cholesteric liquid crystal compound of the recording medium is fixed in a state in which it reflects light having a first wavelength, and a second process in which a different part of the cholesteric liquid crystal compound becomes fixed in a state in which it reflects light having a second wavelength that is shorter than the first wavelength.

Using the recording method pertaining to the present invention, because all or part of the cholesteric liquid crystal compound becomes fixed in a state in which it reflects light having a desired first wavelength in advance, by performing writing so that the liquid crystal will be fixed in a state in which it reflects light having a desired second wavelength that is shorter than the first wavelength, recording using light having the first wavelength and light having the second wavelength may be completed and recording using desired multiple reflection colors may be made.

In the first process, after the cholesteric liquid crystal compound is heated until all or part of it exhibits an isotropic phase, it is cooled to the temperature where it exhibits a cholesteric liquid crystal phase in which it selectively reflects light having a first wavelength. The cholesteric liquid crystal compound is then rapidly cooled such that it becomes fixed in the state in which it reflects light having the first wavelength. Through this process, recording by means of reflection colors that cannot be obtained using the recording method utilizing heating and rapid cooling may be performed.

In the second process, after part of the cholesteric liquid crystal compound of the recording medium is fixed in the first wavelength light reflection state a part thereof is heated until it exhibits a cholesteric liquid crystal phase in which it selectively reflects light having a desired second wavelength that is shorter than the first wavelength, it is rapidly cooled such that it becomes fixed in the state where it reflects light having the second wavelength. Using this method, gradual cooling from an isotropic phase is not needed, and therefore, the temperature control for image writing is made simpler, enabling fast recording.

Alternatively, in the second process, after part of the cholesteric liquid crystal compound of the recording medium is fixed in the first wavelength light reflection state, a different part of the cholesteric is heated until it exhibits a cholesteric liquid crystal phase in which it selectively reflects light having a desired second wavelength that is shorter than the first wavelength and is then rapidly cooled such that it becomes fixed in the state where it reflects light having the second wavelength. Using this method, gradual cooling from an isotropic phase is not needed, and therefore, the temperature control for image writing is made simpler, enabling fast recording.

For the heat reversible recording medium, a recording medium comprising a recording layer including a cholesteric liquid crystal compound, which is placed on a base, the surface of which has at least a light absorbing capability, may be used.

For the cholesteric liquid crystal compound, a liquid crystal compound is used that has the following features: (i) the selective reflection wavelength range is in the 380 nm to 800 nm range both when the temperature rises and when it falls, and (ii) the longest selective reflection wavelength when the temperature falls is longer than the longest selective reflection wavelength when the temperature rises. Alternatively, a liquid crystal compound may be used which changes to a second wavelength reflective selection state at a temperature that is included in the temperature range in which the compound exhibits a cholesteric liquid crystal phase when the temperature rises.

The recording device pertaining to the present invention has a first recording unit that fixes all or part of the cholesteric liquid crystal compound of the heat reversible recording medium, including a cholesteric liquid crystal compound in a state in which the liquid crystal compound reflects light having a first wavelength. The recording device pertaining to the present invention also has a second recording unit that fixes part of the cholesteric liquid crystal compound of the recording medium, which may be a portion of the part that was fixed in the first wavelength reflection state or may be a different part, in a state in which the liquid crystal compound reflects light having a second wavelength, which is shorter than the first wavelength.

Using the recording device pertaining to the present invention, all or part of the cholesteric liquid crystal compound is fixed in advance by means of the first recording unit in a state in which it reflects light having a desired first wavelength, and therefore, by performing writing so that the liquid crystal compound becomes fixed by the second recording unit in a state in which it reflects light having a desired second wavelength that is shorter than the first wavelength, recording by means of light having the first wavelength as well as light having the second wavelength may be completed, and recording using desired multiple reflection colors may be made.

The first recording unit may include a first heater that heats the cholesteric liquid crystal compound of the recording medium until all or part of it exhibits an isotropic phase, a first cooler that cools the cholesteric liquid crystal compound, which is in an isotropic phase, to the prescribed temperature at which it exhibits a cholesteric liquid crystal phase in which it selectively reflects light having a first wavelength, and a first rapid cooler that rapidly cools the liquid crystal compound, which is at the prescribed temperature, so that it becomes fixed in the state in which it reflects light having the first wavelength. The first heater may comprise heat rollers or may also comprise a thermal head or laser scanning head.

The second recording unit may include a second heater that heats part of the cholesteric liquid crystal compound of the recording medium fixed in the first wavelength light reflection state to a cholesteric liquid crystal phase in which it selectively reflects light having a desired second wavelength that is shorter than the first wavelength, and a second rapid cooler that rapidly cools the heated liquid crystal compound and fixes it in the second wavelength light reflection state. The second heater may comprise a thermal head or laser scanning head or may also comprise heat rollers.

The recording device may also have a reset device that resets the cholesteric liquid crystal compound of the recording medium to an opaque state. The reset device may comprise a system that heats the liquid crystal compound to a temperature that is lower than the temperature range in which the liquid crystal compound exhibits a liquid crystal phase when the temperature rises as well as a system that cools it down to fix it in an opaque state. When this method is used, because heating to and/or gradual cooling from a high temperature at which the liquid crystal compound exhibits an isotropic phase is not necessary, resetting may be completed quickly.

BRIEF DESCRIPTION OF THE DRAWINGS

A more complete understanding of the present invention and its advantages will be readily apparent from the following Detailed Description taken in conjunction with the accompanying drawings.

DETAILED DESCRIPTION OF THE PREFERRED EMBODIMENTS

The embodiments of the recording method and recording device using a heat reversible recording medium pertaining to the present invention are explained below with reference to the accompanying drawings.

Construction of Heat Reversible Recording Medium

FIGS. 1 through 4 show the constructions of the first through fourth examples of the heat reversible recording medium used in the recording method pertaining to the present invention.

Figure 1:
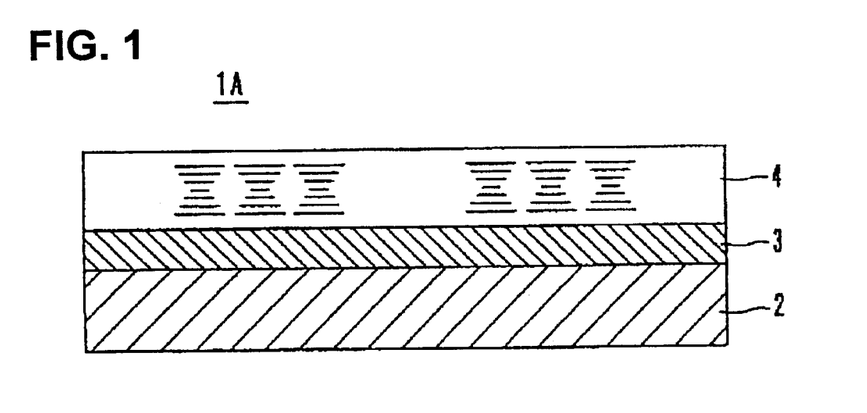
FIG. 1 is a cross-sectional view showing a first example of the heat reversible recording medium used in conjunction with the recording method pertaining to the present invention.

In the first example shown in FIG. 1, the heat reversible recording medium 1A comprises, from the bottom, a base layer 2, a middle layer 3 and a recording layer 4. The base layer 2 comprises glass or pliable polymer film.

The middle layer 3 includes a component that has the function of absorbing visible light, such that it absorbs the light that passes through the recording layer 4, thereby causing all of the observation surface (the surface of the recording layer 4) other than the areas exhibiting selective reflection to appear black. Where a laser containing wavelengths that may be absorbed by the middle layer 3 is used as the light for recording, the middle layer 3 may function as a photo-thermal conversion unit.

The middle layer 3 may be formed by applying onto the base layer 2 an isopropyl alcohol solution mixed with silicon resin on which carbon black is dispersed as a catalyst, and then hardening the applied layer by means of drying or heating, for example.

The recording layer 4 is a liquid crystal layer including a cholesteric liquid crystal compound. For the cholesteric liquid crystal compound, for example, a compound such as compound (A), compound (B) or compound (C) shown below, and having the chemical formulae illustrated, may be used as the main ingredient. A cholesteric liquid crystal compound of this type has the characteristics that (i) the selective reflection wavelength range falls within the 380 nm to 800 nm range both when the temperature rises and when it falls, and (ii) the temperature range and the selective reflection wavelength range in which the liquid crystal compound exhibits a cholesteric liquid crystal phase differ when the temperature rises and when it falls, as shown in FIG. 8. In the present invention, using these characteristics, color image recording may be performed on the recording layer 4 at a high speed, and rewriting is also possible.

Chemical Structure (A):

Chemical Structure (B):

Chemical Structure (C):

The compound (A) is a material that is publicly known through the literature referenced above, etc. The compounds (B) and (C), however, may be manufactured by dissolving or dispersing a dicarboxylic acid compound or dicarboxylic acid halide that has an alkyl chain at its center as well as cholesterol in an appropriate solvent, adding a basic compound or acidic compound where necessary, and heating the solution to condense both compounds.

Figure 2:
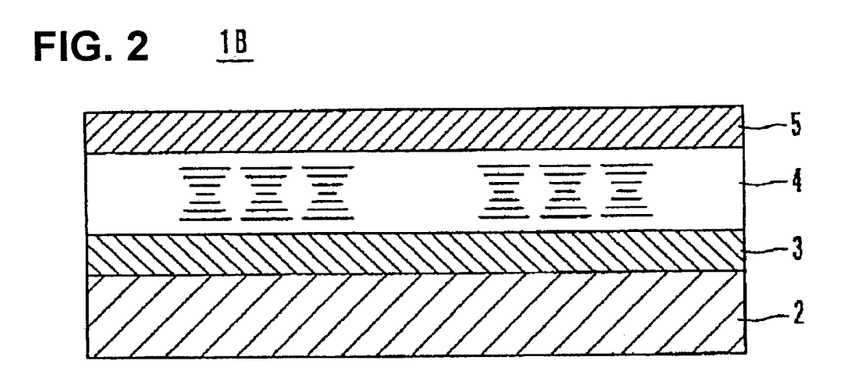
FIG. 2 is a cross-sectional view showing a second example of the heat reversible recording medium used in conjunction with the recording method pertaining to the present invention.

The heat reversible recording medium 1B shown in FIG. 2 comprises the recording medium 1A and a protective layer 5 comprising glass or polymer film that is placed on top of the recording layer 4. Use of a protective layer 5 in this way increases the mechanical strength of the recording layer 4 so that such problems as scratching, scarring and peeling of the recording layer 4 may be prevented.

Figure 3:
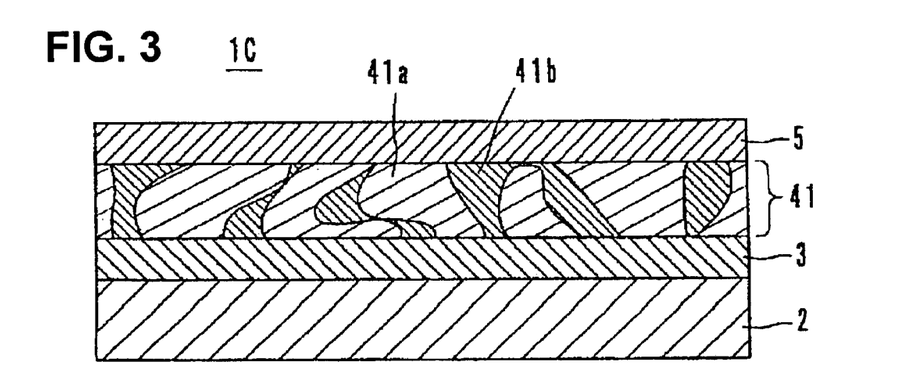
FIG. 3 is a cross-sectional view showing a third example of the heat reversible recording medium used in conjunction with the recording method pertaining to the present invention.

The recording layer 41 of the heat reversible recording medium 1C shown in FIG. 3 consists of composite film comprising a cholesteric liquid crystal compound 41a and a polymer resin film 41b, but the rest of its construction is the same as that of the recording medium 1B shown in FIG. 2. The composite film may be manufactured by mixing a liquid crystal compound and a light-hardened resin material and then irradiating light, such as UV light, to harden the light-hardened resin material.

Figure 4:
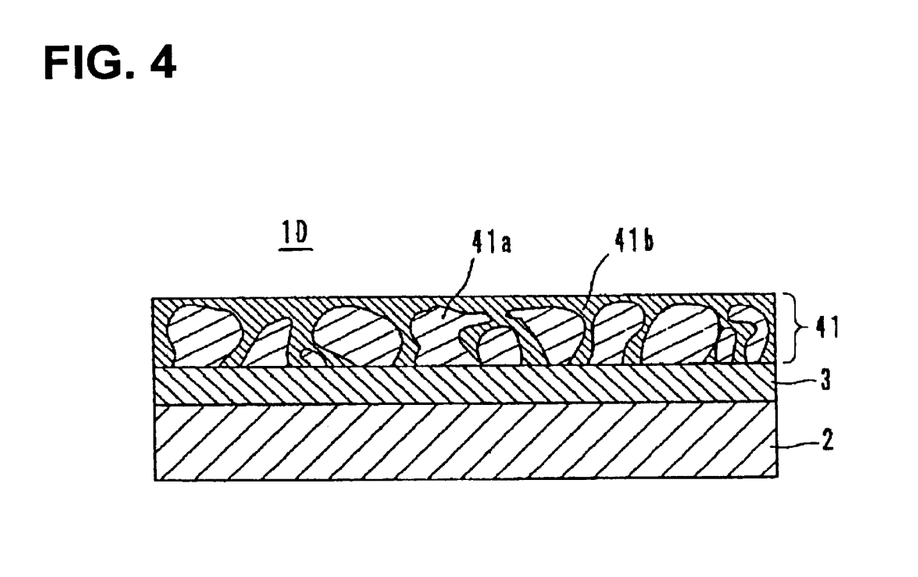
FIG. 4 is a cross-sectional view showing a fourth example of the heat reversible recording medium used in conjunction with the recording method pertaining to the present invention.

The protective layer 5, of the recording medium 1C shown in FIG. 3, is eliminated in the heat reversible recording medium 1D shown in FIG. 4. Although the protective layer 5 is eliminated, the resin film 41b formed on the surface of the recording layer 41 functions as a protective layer. The strength of the recording layer 41 is therefore sufficient, such that damage due to external forces such as bending or friction is minimized. In addition, if the cholesteric liquid crystal compound is heated to a temperature at which it exhibits an isotropic phase, there is little deterioration of the recording layer 41.

In the recording media 1A, 1B, 1C and 1D of the first through fourth examples, the middle layer 3 is placed between the base layer 2 and the recording layer 4 or 41, but it may also be placed beneath the bottom surface of the base layer 2. Further, an infrared (IR) light absorbing agent may be dispersed in the middle layer and/or the protective layer 5, thereby imparting the function of converting infrared light to heat. The middle layer 3 and/or the protective layer 5 may be formed of an IR light absorbing material as well. Alternatively, a sheet member that has an IR light absorbing function may be used. By having the IR light absorbing function in a layer located near the recording layer 4 or 41 in this way, image writing by means of an IR laser that is commonly used in laser printers becomes possible.

Recording Method

The recording method using the heat reversible recording medium includes a first process in which all or part of the cholesteric liquid crystal compound of the recording medium becomes fixed in a state in which it reflects light having a first wavelength, and a second process in which part of the cholesteric liquid crystal compound of the recording medium fixed in the first wavelength light reflection state then becomes fixed in a state in which it reflects light having a second wavelength that is shorter than the first wavelength.

Alternatively, the recording method using the heat reversible recording medium includes a first process in which all or part of the cholesteric liquid crystal compound of the recording medium becomes fixed in a state in which it reflects light having a first wavelength, and a second process in which a different part of the cholesteric liquid crystal compound of the recording medium becomes fixed in a state in which it reflects light having a second wavelength that is shorter than the first wavelength.

In the first process, the cholesteric liquid crystal compound of the recording medium is first heated to a temperature at which all or part of it exhibits an isotropic phase, and is then cooled down to a temperature at which it exhibits a cholesteric liquid crystal phase in which it selectively reflects light having a first wavelength. It is preferred that the cholesteric liquid crystal compound then be rapidly cooled so that it becomes fixed in the first wavelength reflection state. In this way, the reproducible selective reflection wavelength range may be made large.

Heating of the recording medium may be performed by means of various exposure devices such as a hot plate, hot stamp, heat roller or flash lamp. A thermal head or laser scanning head may be used instead. Where an exposure device or laser scanning head is used, a photo-thermal conversion member that absorbs the light irradiated from the exposure device or laser scanning head and converts it into heat should be included in the recording medium. For the means to cool down the recording medium to the appropriate temperature, a hot plate, hot stamp or heat rollers, which can be maintained at the appropriate temperature, may be used. Further, rapid cooling of the recording medium may be attained by having a coolant such as gas or a low temperature or heat-radiating solid body come into contact with the recording medium. Where the area heated is small, rapid cooling may be attained through natural cooling. While one preferred embodiment uses heating devices adapted to heat large areas of the recording medium, other embodiments employ a means capable of performing selective heating for each small area, such as a thermal head, laser head or light shutter array.

In the second process, it is preferred that part of the cholesteric liquid crystal compound of the recording medium fixed in the first wavelength reflection state be heated until it attains a cholesteric liquid crystal phase in which it selectively reflects light having a desired second wavelength that is shorter than the first wavelength, and then be rapidly cooled so that it becomes fixed in the second wavelength light reflection state. In this way, images may be recorded more quickly based on simple temperature control.

For the heating and cooling in the second process, the same means may be used as those explained with reference to the first process. Regarding the heating in particular, it is preferred that the heating method used employ a means capable of performing selective heating for each small area, such as a thermal head, laser head or light shutter array.

The heating and cooling steps of the first and second processes wherein the recording medium is sequentially heated and/or cooled to various predetermined temperatures, so as to achieve the effects described, may be referred to hereafter as subjecting the recording medium to a predetermined temperature "profile."

Basic Construction of Recording Device

Figure 5:
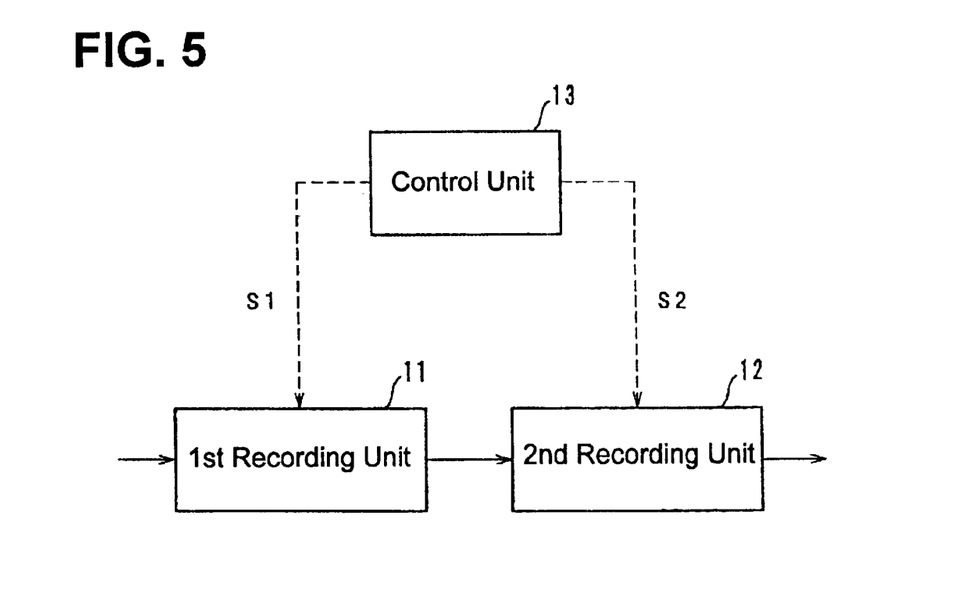
FIG. 5 shows the basic construction of the recording device pertaining to the present invention.

FIG. 5 shows the construction of the main components of a recording device used in the recording method pertaining to the present invention. The recording device comprises a first recording unit 11, a second recording unit 12 and a control unit 13 that controls the two recording units. The first recording unit 11 heats the entire surface of the recording medium until the cholesteric liquid crystal compound exhibits an isotropic phase, then cools it to a temperature at which the cholesteric liquid crystal compound exhibits a cholesteric liquid crystal phase in which it selectively reflects long wavelength light, and finally rapidly cools it to fix it in the long wavelength light reflection state.

The second recording unit 12 comprises a thermal head or laser scanning head. After heating the cholesteric liquid crystal compound fixed in the long wavelength reflection state by means of the recording unit 11 until it exhibits a cholesteric liquid crystal phase in which it selectively reflects a desired short wavelength light, the second recording unit 12 rapidly cools the cholesteric liquid crystal compound so that it becomes fixed in the short wavelength light reflection state.

The control unit 13 outputs control signals S1 to the first recording unit 11 and control signals S2 to the second recording unit 12. The control signals S1 control the heating temperature and cooling speed of the first recording unit 11. The control signals S2 are signals based on the image data. Where the second recording unit 12 comprises a thermal head, the signals are responsible for temperature control of each heat generating element. Where the second recording unit 12 comprises a laser scanning head, the signals are responsible for modulation of the laser generating elements and laser scanning control.

Thermal Printer

Figure 6:
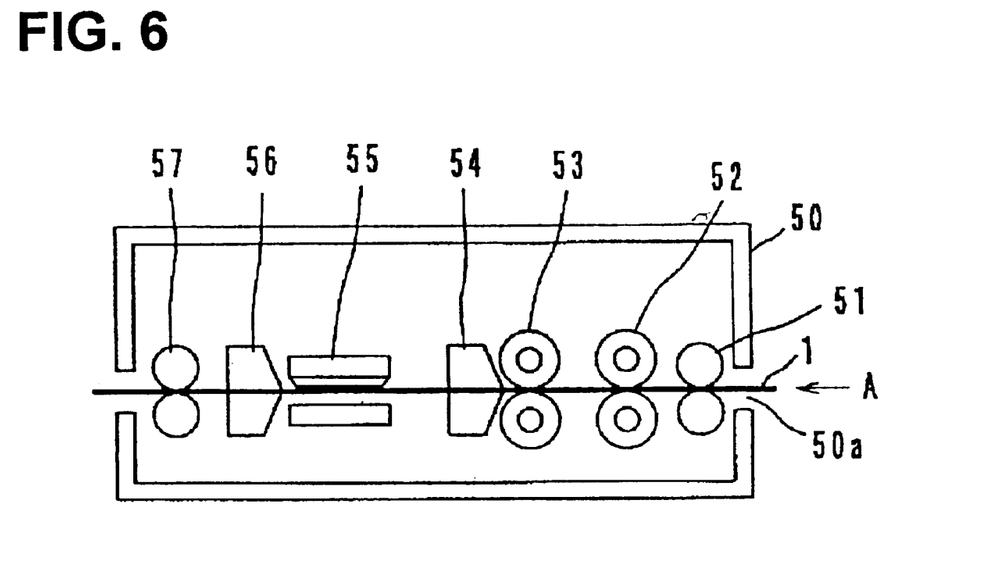
FIG. 6 shows the basic construction of a thermal printer.

FIG. 6 shows the basic construction of a thermal printer, which is one possible specific embodiment of the recording device. This thermal printer has, along the direction of conveyance (A) for the recording medium 1 and located in a housing 50, first conveyance rollers 51, first heat rollers 52, second heat rollers 53, a first cooling unit 54, a thermal head 55, a second cooling unit 56 and second conveyance rollers 57.

The recording medium 1 enters the recording device from the entrance 50a and is conveyed from the first conveyance rollers 51 to the first heat rollers 52, where it is heated to a temperature at or above the temperature at which the liquid crystal compound exhibits an isotropic phase. The recording medium 1 then passes through the second heat rollers 53, which are maintained at the temperature at which the liquid crystal compound enters a state in which it selectively reflects long wavelength light. When the recording medium 1 is rapidly cooled by the first cooling unit 54, the liquid crystal compound becomes fixed in the long wavelength reflection state. Furthermore, the areas in which recording should take place using a short wavelength color are heated by the thermal head 55. When it is rapidly cooled by the second cooling unit 56, the recording medium 1 becomes fixed in the short wavelength light reflection state. A desired image is recorded on the recording medium 1 in this way, and the recording medium 1 is ejected by the second conveyance rollers 57.

Where the recording medium 1 is to be reset to an opaque state, both the first and second heat rollers 52 and 53 should be maintained at a temperature equal to or above the temperature at which the liquid crystal compound exhibits an isotropic phase, or the second heat rollers 53 should be retracted from the path of the recording medium 1. Also, the operation of the second cooling unit 56 should be disabled, so that the recording medium 1 may be gradually cooled. Alternatively, the first heat rollers 52 may be maintained at room temperature while the second heat rollers 53 are set to a temperature that is higher than room temperature, but lower than the lowest temperature in the liquid crystal phase temperature range, that is present when the temperature of the liquid crystal compound rises so that the recording medium 1 is heated by the second heat rollers 53 to this temperature and is then rapidly cooled by the first cooling unit 54.

In addition, if the built-in heaters of the second heat rollers 53 comprise multiple heat-generating elements that are distributed along the length of the rollers 53, such that each heat-generating element may be selectively turned ON and OFF, the area to be fixed in the long wavelength reflection state may be limited to a part of the recording medium 1.

Laser Printer

Figure 7:
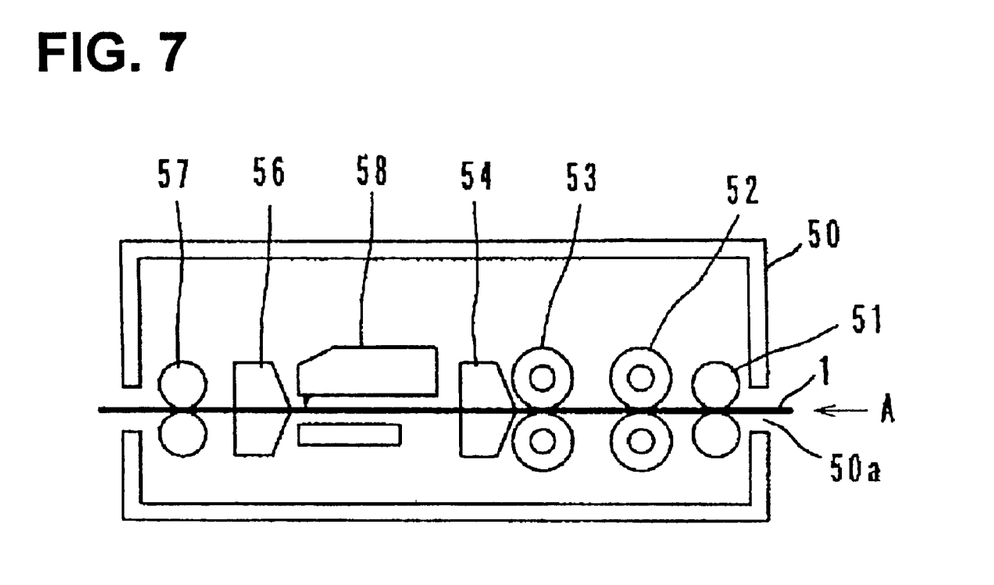
FIG. 7 shows the basic construction of a laser printer.

FIG. 7 shows the basic construction of a laser printer, which is another possible embodiment of the recording device. In this laser printer, the thermal head 55 of the thermal printer shown in FIG. 6 is replaced with a laser scanning head 58. The rest of the construction is the same as the one shown in FIG. 6, and will thus not be explained in further detail.

Thermal Printer 2

Figure 9:
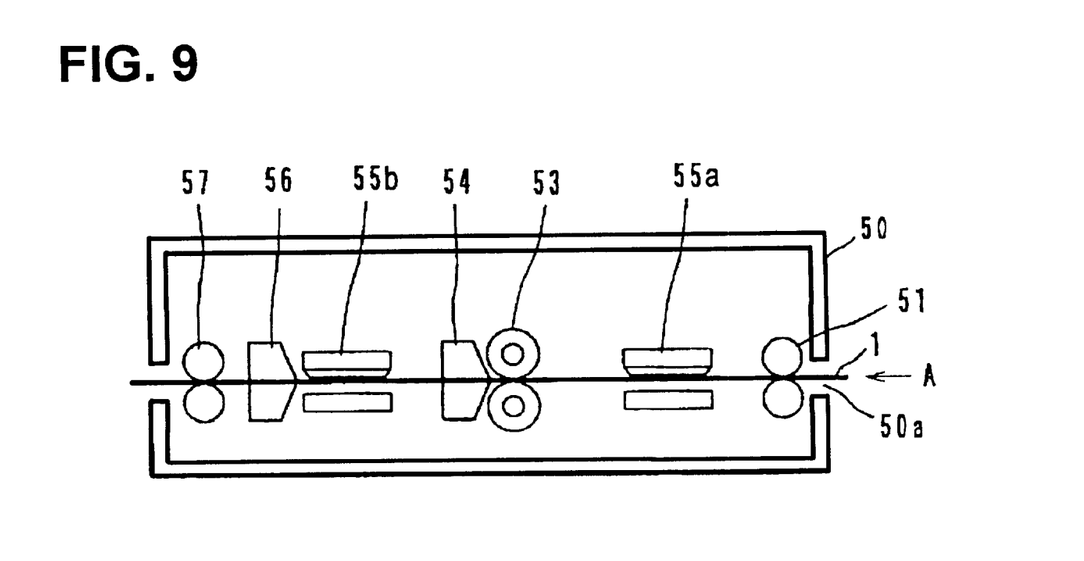
FIG. 9 shows an additional construction of a thermal printer.

FIG. 9 shows the basic construction of another thermal printer, which is another possible specific embodiment of the recording device. This thermal printer has, along the direction of conveyance (A) for the recording medium 1 and located in a housing 50, first conveyance rollers 51, first thermal head 55a, second heat rollers 53, a first cooling unit 54, second thermal head 55b, a second cooling unit 56 and second conveyance rollers 57.

The recording medium 1 enters the recording device from the entrance 50a and is conveyed from the first conveyance rollers 51 to the first thermal head 55a, where selected portion(s) of the recording medium are heated to a temperature at or above the temperature at which the liquid crystal compound exhibits an isotropic phase. The recording medium 1 then passes through the second heat rollers 53, which are maintained at the temperature at which the liquid crystal compound enters a state in which it selectively reflects long wavelength light. The second heat rollers 53 change the temperature of the portions of the recording medium 1 which have previously been heated by first thermal head 55a to a temperature where the recording medium selectively reflects long wavelength light. In the case where the second heat rollers 53 also heat portions of the recording medium which were not heated by first thermal head 55a, so long as the second heat rollers are maintained at or below the temperature which, for a rising temperature process, is a temperature of transition from the solid state to the cholesteric liquid crystal state (for example 95° C. in the example shown in FIG. 8), the portions of the recording medium which were not heated by first thermal head 55a but which are heated by second heat rollers 53 will not have a solid state thereof changed.

When the recording medium 1 is rapidly cooled by the first cooling unit 54, the portions of the liquid crystal compound which had been heated by thermal head 55a become fixed in the long wavelength reflection state. Next, the areas in which recording should take place using a short wavelength color are heated by second thermal head 55b. Then, when the recording medium 1 is rapidly cooled by the second cooling unit 56, the recording medium 1 becomes fixed in the short wavelength light reflection state. A desired image is recorded on the recording medium 1 in this way, and the recording medium 1 is ejected by the second conveyance rollers 57.

By this approach different portions of the recording medium can be fixed in states which selectively reflect long and short wavelength light, respectively. The portions of the recording medium 1 fixed in states which selectively reflect long and short wavelength light, respectively, can be overlapping regions or can be regions which are separated from each other.

EXAMPLE 1

In the example 1 described below, the recording method of the present invention was applied in conjunction with a recording medium equipped with a liquid crystal layer including the compound (A).

When the temperature range in which the cholesteric liquid crystal compound (A) exhibited a liquid crystal phase was measured using a differential scanning calorimeter, the range was 95° C. to 111° C. during a period when the temperature rose and was 74° C. to 111° C. during a period when the temperature fell. The compound (A) was placed on a well-washed glass panel and heated to 130° C. on a hot plate so that it would melt. The molten compound (A) was sandwiched between the glass panel and another glass panel, and cooled down to room temperature, whereupon a liquid crystal cell was obtained.

The reflection spectrum was measured using an MCPD-7000 unit (by Otsuka Electronic Co., Ltd.). When the reflection spectrum was measured while the liquid crystal cell was heated to 130° C. on a hot plate, the temperature range in which the compound exhibited selective reflection was 95° C. to 110° C., which essentially matched the measurement result achieved by means of the differential scanning calorimeter. The peak reflection wavelength range was 400 nm to 430 nm.

The liquid crystal cell was heated up to 130° C. so that the liquid crystal compound would exhibit an isotropic phase. When the reflection spectrum was then measured while the liquid crystal cell was cooled down, the temperature range in which selective reflection appeared was 75° C. to 110° C., which essentially matched the measurement result achieved by means of the differential scanning calorimeter. The peak reflection wavelength range was 400 nm to 560 nm.

The liquid crystal cell was then heated to 130° C. on a hot plate so that it would exhibit an isotropic phase, and was then cooled down to 80° C. to a state in which it selectively reflected green light. When it was then rapidly cooled down to room temperature, the liquid crystal compound was fixed in the selective reflection state for green. Furthermore, when a hot stamp heated to 100° C. was applied to the liquid crystal cell and the cell rapidly cooled, the area on which the hot stamp was applied was fixed in a selective reflection state for dark blue. Thus, as described above, by performing heating and rapid cooling after fixing the liquid crystal compound in a selective reflection state for long wavelength light, the inventor was able to fix it in a selective reflection state for light having a desired short wavelength.

After the liquid crystal cell was heated to 130° C. on a hot plate so that it would exhibit an isotropic phase, it was then cooled to 90° C., to a state in which it selectively reflected blue light. Then it was rapidly cooled down to room temperature, so that the liquid crystal compound was fixed in the selective reflection state for blue. Further, when a hot stamp heated to 100° C. was then applied to the liquid crystal cell and the cell rapidly cooled, the area on which the hot stamp was applied was fixed in a selective reflection state for dark blue. Thus, as described above, by performing heating and rapid cooling after fixing the liquid crystal compound in a selective reflection state for long wavelength light, the inventor was able to fix it in a selective reflection state for light having a desired short wavelength, as in the previous example.

On the other hand, after the liquid crystal cell was heated to 130° C. on a plate so that it would exhibit an isotropic phase, it was cooled to 80° C. to a state in which it selectively reflected green light. When it was then rapidly cooled down to room temperature, the liquid crystal compound was fixed in the selective reflection state for green. Further, when the liquid crystal cell was heated to 90° C. on a hot plate, the liquid crystal compound did not enter a selective reflection state, but became opaque.

As described above, during a period when the temperature falls, even if the liquid crystal compound is within the temperature range in which it exhibits a cholesteric liquid crystal phase, unless it is in the temperature range in which it exhibits a liquid crystal phase when the temperature rises, recording using a selective reflection state for the desired long wavelength light is not possible based on temperature control comprising heating to a prescribed temperature followed by rapid cooling. However, the opaque state that is obtained by heating the liquid crystal compound to a temperature that is lower than the liquid crystal phase temperature range and then cooling it may be used as a reset state for the liquid crystal layer. In this case, gradual cooling is not necessary and the high temperature required for the liquid crystal compound to attain an isotropic phase is not needed either. Consequently, resetting may be performed quickly.

When the liquid crystal cell was gradually cooled down to room temperature after it was heated to 130° C. on a hot plate so that it would exhibit an isotropic phase, the liquid crystal compound was fixed in an opaque state. In this way, the white reset state may be attained based on temperature control comprising heating to the liquid crystal phase temperature range followed by gradual cooling.

EXAMPLE 2

In the example 2 described below, the recording method of the present invention was applied regarding a recording medium equipped with a liquid crystal layer including the compounds (A) and (B).

The compounds (A) and (B), which exhibit a cholesteric liquid crystal phase, were heated via a glass panel on a hot plate to 140° C. until they melted, and were then mixed in a 1:1 ratio by weight. When the temperature range within which the mixture exhibited a liquid crystal phase was measured using a differential scanning calorimeter, the range was 64° C. to 132° C. when the temperature rose and 40° C. to 136° C. when the temperature fell. The mixture was placed on a well-washed glass panel and heated to 140° C. on a hot plate so that it would melt. The molten mixture was sandwiched between the glass panel and another glass panel and then cooled down to room temperature, whereupon a liquid crystal cell was obtained.

When the reflection spectrum was measured using the MCPD-7000 unit while the liquid crystal cell was heated to 140° C. on a hot plate, the temperature range in which the compound selectively reflected visible light was 65° C. to 115° C., while it performed selective reflection of light in the ultraviolet range when the temperature was above 115° C. This temperature range essentially matched the measurement result achieved by means of the differential scanning calorimeter. The peak reflection wavelength in the visible light range was 390 nm to 470 nm.

The liquid crystal cell was then heated up to 140° C. so that the liquid crystal compound would exhibit an isotropic phase. When the reflection spectrum was then measured while the liquid crystal cell was cooled down, the temperature range in which the compound selectively reflected visible light was 45° C. to 120° C. The liquid crystal cell performed selective reflection of light in the ultraviolet range when the temperature was above 120° C. This temperature range essentially matched the measurement result achieved by means of the differential scanning calorimeter. The peak reflection wavelength range was 390 nm to 760 nm.

After the liquid crystal cell was heated to 140° C. on a hot plate so that it would exhibit an isotropic phase, it was cooled to 65° C. to a state in which it selectively reflected orange light. When it was then rapidly cooled down to room temperature, the liquid crystal compound was fixed in the selective reflection state for orange. Furthermore, when a hot stamp heated to 105° C. was applied to the liquid crystal cell and the cell rapidly cooled, the area on which the hot stamp was applied was fixed in a selective reflection state for blue. As described above, by performing heating and rapid cooling after fixing the liquid crystal compound in a selective reflection state for long wavelength light, the inventor was able to fix it in a selective reflection state for light having a desired short wavelength.

After the liquid crystal cell was heated to 140° C. on a hot plate so that it would exhibit an isotropic phase, it was then cooled to 55° C. to a state in which it selectively reflected red light. When the cell was then rapidly cooled down to room temperature, the liquid crystal compound was fixed in the selective reflection state for red. Furthermore, when a hot stamp heated to 75° C. was applied to the liquid crystal cell and the cell rapidly cooled, the area on which the hot stamp was applied was fixed in a selective reflection state for green. Thus, as described above, by performing heating and rapid cooling after fixing the liquid crystal compound in a selective reflection state for long wavelength light, the inventor was able to fix it in a selective reflection state for light having a desired short wavelength, as in the previous example.

On the other hand, after the liquid crystal cell was heated to 140° C. on a hot plate so that it would exhibit an isotropic phase, it was cooled to 90° C. to a state in which it selectively reflected blue light. When the cell was then rapidly cooled down to room temperature, the liquid crystal compound was fixed in the selective reflection state for blue. Furthermore, when the liquid crystal cell was heated to 60° C. on a hot plate, the liquid crystal compound did not enter a selective reflection state, but became opaque.

EXAMPLE 3

In the example 3 described below, the recording method of the present invention was applied regarding a recording medium equipped with a liquid crystal layer including the compounds (A) and (C).

The compounds (A) and (C), which exhibit a cholesteric liquid crystal phase, were heated via a glass panel on a hot plate to 130° C. until they melted, and were then mixed in a 1:1 ratio by weight. When the temperature range in which the mixture exhibited a liquid crystal phase was measured using a differential scanning calorimeter, the range was 77° C. to 125° C. when the temperature rose and 30° C. to 125° C. when the temperature fell. The mixture was placed on a well-washed glass panel and heated to 130° C. on a hot plate so that it would melt. The molten mixture was sandwiched between the glass panel and another glass panel and then cooled down to room temperature, whereupon a liquid crystal cell was obtained.

When the reflection spectrum was measured using the MCPD-7000 unit while the liquid crystal cell was heated on a hot plate to 130° C., the temperature range in which the compound selectively reflected visible light was 78° C. to 110° C., while it performed selective reflection of light in the ultraviolet range when the temperature was above 110° C. This temperature range essentially matched the measurement result achieved by means of the differential scanning calorimeter. The peak reflection wavelength in the visible light range was 380 nm to 510 nm.

The liquid crystal cell was then heated up to 130° C. so that the liquid crystal compound would exhibit an isotropic phase. When the reflection spectrum was then measured while the liquid crystal cell was cooled down, the temperature range in which the compound selectively reflected visible light was 45° C. to 105° C. It performed selective reflection of light in the ultraviolet range when the temperature was above 105° C. This temperature range essentially matched the measurement result achieved by means of the differential scanning calorimeter. The peak reflection wavelength range was 400 nm to 760 nm.

After the liquid crystal cell was heated to 130° C. on a hot plate so that it would exhibit an isotropic phase, it was cooled to 50° C. to a state in which it selectively reflected red light. When it was then rapidly cooled down to room temperature, the liquid crystal compound was fixed in the selective reflection state for red. Furthermore, when a hot stamp heated to 100° C. was applied to the liquid crystal cell and the cell rapidly cooled, the area on which the hot stamp was applied was fixed in a selective reflection state for dark blue. Thus, as described above, by performing heating and rapid cooling after fixing the liquid crystal compound in a selective reflection state for long wavelength light, the inventor was able to fix it in a selective reflection state for light having a desired short wavelength.

After the liquid crystal cell was heated to 130° C. on a hot plate so that it would exhibit an isotropic phase, it was then cooled to 70° C. to a state in which it selectively reflected yellow light. When it was then rapidly cooled down to room temperature, the liquid crystal compound was fixed in the selective reflection state for yellow. Furthermore, when a hot stamp heated to 85° C. was applied to the liquid crystal cell and the cell rapidly cooled, the area on which the hot stamp was applied was fixed in a selective reflection state for blue. Thus, as described above, by performing heating and rapid cooling after fixing the liquid crystal compound in a selective reflection state for long wavelength light, the inventor was able to fix it in a selective reflection state for light having a desired short wavelength, as in the previous experiment.

On the other hand, after the liquid crystal cell was heated to 130° C. on a hot plate so that it would exhibit an isotropic phase, it was cooled to 55° C. to a state in which it selectively reflected red light. When it was then rapidly cooled down to room temperature, the liquid crystal compound was fixed in the selective reflection state for red. Furthermore, when the liquid crystal cell was then heated to 75° C. on a hot plate, the liquid crystal compound did not enter a selective reflection state, but became opaque.

Other Embodiments

The heat reversible recording medium recording method pertaining to the present invention is not limited to these embodiments, and may be varied within its essential scope.

In particular, various compounds other than the compounds (A), (B) and (C) may be used for the cholesteric liquid crystal compound.

Further to this, in the above embodiments, although separate recording units are provided for the different temperature profiles, a single recording unit may be commonly used for the different temperature profiles. In this case, the recording medium may be reciprocally transported, as in a color thermal ink transfer printer, so that the recording medium is subjected to the different temperature profiles at a single position where the single recording unit is provided.

Although the present invention has been fully described by way of example with reference to the accompanying drawings, it is to be understood that various changes and modifications will be apparent to those skilled in the art.

That which is claimed is:

1. A method of recording using a heat sensitive recording medium, which includes a cholesteric liquid crystal compound, said method comprising the steps of:
   a first step of fixing a first portion of the cholesteric liquid crystal compound of the recording medium in a first state in which it reflects light having a first wavelength; and
   a second step of fixing at least a second portion of the cholesteric liquid crystal compound of the recording medium in a second state in which it reflects light having a second wavelength that is shorter than the first wavelength,
   wherein said second portion is a portion of said first portion.

2. A method of recording in accordance with claim 1, wherein:
   said first step includes an isotropic phase to cholesteric liquid crystal phase transition; and
   said second step does not include an isotropic phase to cholesteric liquid crystal phase transition.

3. A method of recording in accordance with claim 1, wherein:
   said first step includes, in the order recited, (a) heating said first portion from a solid phase until at least a portion thereof exhibits an isotropic phase, (b) cooling the thus heated first portion until said first state thereof, which selectively reflects light having a first wavelength, is exhibited, and (c) rapidly cooling said first portion so that said first portion is fixed in said first state; and said second step includes, in the order recited, (a) heating said second portion of the cholesteric liquid crystal compound until said second state thereof, which selectively reflects light having a second wavelength, is exhibited, and (b) rapidly cooling said second portion so that said second portion is fixed in said second state.

4. A method of recording in accordance with claim 3, wherein said recording medium comprises:
  a base, at least the surface of which has the ability to absorb light; and
  a recording layer, including a cholesteric liquid compound, placed on top of said base.

5. A method of recording in accordance with claim 3, wherein said cholesteric liquid crystal compound has a selective reflection wavelength range in the range of approximately 380 nm to approximately 800 nm, both in the case where a temperature thereof is rising and in the case where a temperature thereof is falling; and
  wherein a longest selective reflection wavelength of said cholesteric liquid crystal compound, in the case where the temperature thereof is rising, is longer than a longest selective reflection wavelength of said cholesteric liquid crystal compound in the case where the temperature thereof is falling.

6. A method of recording in accordance with claim 3, wherein said cholesteric liquid crystal compound changes to said second state, at a temperature that is included in a temperature range in which said cholesteric liquid crystal compound exhibits a cholesteric liquid crystal phase when the temperature rises.

7. A method of recording in accordance with claim 1, wherein said heat sensitive recording medium comprises:
  a base, at least the surface of which has the ability to absorb light; and
  a recording layer, including a cholesteric liquid compound, placed on top of said base.

8. A method of recording in accordance with claim 1, wherein said cholesteric liquid crystal compound has a selective reflection wavelength range in the range of approximately 380 nm to approximately 800 nm, both in the case where a temperature thereof is rising, and in the case where a temperature thereof is falling; and
  wherein a longest selective reflection wavelength of said cholesteric liquid crystal compound, in the case where the temperature thereof is rising, is longer than a longest selective reflection wavelength of said cholesteric liquid crystal compound in the case where the temperature thereof is falling.

9. A method of recording in accordance with claim 1, wherein said cholesteric liquid crystal compound changes to said second state, at a temperature that is included in a temperature range in which said cholesteric liquid crystal compound exhibits a cholesteric liquid crystal phase when the temperature rises.

10. A method of recording in accordance with claim 1, wherein said second portion includes at least a portion of the first portion of the cholesteric liquid crystal compound of the recording medium.

11. A recording device using a heat sensitive recording medium, comprising:
  a first recording means for fixing a first portion of the cholesteric liquid crystal compound of the recording medium in a first state in which it reflects light having a first wavelength; and
  a second recording means for fixing, a second portion of the cholesteric liquid crystal compound of the recording medium in a second state in which it reflects light having a second wavelength that is shorter than the first wavelength,
  wherein said second portion is a portion of said first portion.

12. A recording device in accordance with claim 11, wherein the first recording means includes:
  a first heating means for heating said first portion from a solid phase until at least a portion thereof exhibits an isotropic phase;
  a first cooling means for cooling the thus heated first portion until said first state thereof, which selectively reflects light having a first wavelength, is exhibited; and
  a first rapid cooling means for rapidly cooling said first portion so that said first portion is fixed in said first state.

13. A recording device in accordance with claim 12, wherein the first heating means comprises heat rollers.

14. A recording device in accordance with claim 12, wherein the second heating means comprises one of a thermal head and a laser scanning head.

15. A recording device in accordance with claim 11, wherein the second recording means includes:
  a second heating means for heating said second portion of the cholesteric liquid crystal compound until said second state thereof, which selectively reflects light having a second wavelength, is exhibited; and
  a second rapid cooling means for rapidly cooling said second portion so that said second portion is fixed in said second state.

16. A recording device in accordance with claim 15, wherein the second heating means comprises one of a thermal head and laser scanning head.

17. A recording device in accordance with claim 11, wherein the recording device further comprises:
  a reset means for resetting the cholesteric liquid crystal compound of the recording medium to an opaque state.

18. A recording device in accordance with claim 17, wherein said reset means comprises:
  a heating means for heating the cholesteric liquid crystal compound to a temperature that is lower than the temperature range in which the cholesteric liquid crystal compound exhibits a liquid crystal phase when the temperature rises; and
  a cooling means for cooling the cholesteric liquid crystal compound to fix the cholesteric liquid crystal compound in an opaque state.

19. A method of forming a color image on a recording medium comprising the steps of:
  providing a heat sensitive recording medium for forming an image thereon, said heat sensitive recording medium including a cholesteric liquid crystal compound;
  subjecting at least a first portion of said heat sensitive recording medium to a first temperature profile such that said at least a first portion of said heat sensitive recording medium thereafter is in a first state in which it reflects light having a first wavelength; and
  subjecting at least a second portion of said heat sensitive recording medium to a second temperature profile, different than said first temperature profile, such that said second portion of said heat sensitive recording medium thereafter is in a second state in which it reflects light having a second wavelength, said second wavelength being shorter than said first wavelength, wherein said second portion is a portion of said first portion.

20. A method of forming a color image in accordance with claim 19, wherein:

said step of providing a heat sensitive recording medium includes providing a heat sensitive recording medium which includes at least one of cholesteric liquid crystal compound (I) and cholesteric liquid crystal compound (II);

wherein a chemical structure for cholesteric liquid crystal compound (I) is:

and wherein a chemical structure for cholesteric liquid crystal compound (II) is:

21. A recording device using a heat sensitive recording medium which includes a cholesteric liquid crystal compound, said recording device comprising:

a first recording means for fixing a first portion of the cholesteric liquid crystal compound of the recording medium in a first state in which it reflects light having a first wavelength; and a second recording means for fixing at least a portion of the first portion of the cholesteric liquid crystal compound of the recording medium fixed by said first recording means in said first state in a second state in which it reflects light having a second wavelength that is shorter than the first wavelength.

22. A recording device in accordance with claim 21, wherein the first recording means includes:

a first heating means for heating said first portion from a solid phase until at least a portion thereof exhibits an isotropic phase;

a first cooling means for cooling the thus heated first portion until said first state thereof, which selectively reflects light having a first wavelength, is exhibited; and a first rapid cooling means for rapidly cooling said first portion so that said first portion is fixed in said first state.

23. A method of forming a color image on a recording medium comprising the steps of:

providing a heat sensitive recording medium for forming an image thereon, said heat sensitive recording medium including a cholesteric liquid crystal compound;

subjecting at least a first portion of said heat sensitive recording medium to a first temperature profile such that said at least a first portion of said heat sensitive recording medium thereafter is in a first state in which it reflects light having a first wavelength; and subjecting at least a portion of said first portion of said heat sensitive recording medium to a second temperature profile, different than said first temperature profile, such that said at least a portion of said first portion of said heat sensitive recording medium thereafter is in a second state in which it reflects light having a second wavelength, said second wavelength being shorter than said first wavelength.

24. A method of recording using a heat sensitive recording medium, which includes a cholesteric liquid crystal compound, said method comprising the steps of:

a first step of fixing a first portion of the cholesteric liquid crystal compound of the recording medium in a first state in which it reflects light having a first wavelength; and a second step, subsequent to said first step of, fixing at least a portion of the first portion of the cholesteric liquid crystal compound of the recording medium in a second state in which it reflects light having a second wavelength that is shorter than the first wavelength.

25. A method of recording in accordance with claim 24, wherein:

said first step includes, in the order recited, (a) heating said first portion from a solid phase until at least a portion thereof exhibits an isotropic phase, (b) cooling the thus heated first portion until said first state thereof, which selectively reflects light having a first wavelength, is exhibited, and (c) rapidly cooling said first portion so that said first portion is fixed in said first state; and said second step includes, in the order recited, (a) heating said at least a portion of the first portion of the cholesteric liquid crystal compound until said second state thereof, which selectively reflects light having a second wavelength, is exhibited, and (b) rapidly cooling said second portion so that said second portion is fixed in said second state.

* * * * *